United States Patent [19]

Mikkor et al.

[11] 4,278,708
[45] Jul. 14, 1981

[54] CONDUCTIVE CORROSION RESISTANT MATERIAL AND ALKALI METAL/POLYSULFIDE BATTERY EMPLOYING SAME

[75] Inventors: Mati Mikkor, Ann Arbor; Samuel S. Shinozaki, Livonia, both of Mich.

[73] Assignee: Ford Motor Company, Dearborn, Mich.

[21] Appl. No.: 89,818

[22] Filed: Oct. 31, 1979

[51] Int. Cl.³ .............................................. B05D 5/12
[52] U.S. Cl. .................................. 427/126.1; 427/190;
427/204; 427/205; 427/369; 427/370;
427/376.3; 427/376.4; 427/376.5; 427/376.6;
427/419.7; 427/123
[58] Field of Search ..................... 427/123, 126.1, 333,
427/370, 204, 205, 383.1, 383.2, 383.3, 383.4,
383.5, 375, 369, 190, 376.3, 376.4, 376.5, 376.6,
419

[56] References Cited

U.S. PATENT DOCUMENTS 3,449,146  6/1969  Dawson .............................. 427/205
3,772,058  11/1973 Bloom ................................ 427/352
4,125,637  11/1978 Tanner ............................... 427/369

*Primary Examiner*—Ronald H. Smith
*Assistant Examiner*—Richard Bueker
*Attorney, Agent, or Firm*—Roger L. May; Olin B. Johnson

[57] ABSTRACT

A method of providing a substrate with a layer of a tertiary compound comprising silicon, silicon carbide and a transition series metal. In accordance with the method, a substrate having at least a surface layer thereon of a transition series metal is coated with silicon carbide particles having an average particle diameter in the range of up to about two microns. The coated substrate is then heated in an inert atmosphere to a temperature between 1000° and 1300° C. for sufficient time to allow diffusion to occur between the silicon carbide and the transition series metal layer, thereby forming the tertiary compound. Substrates coated with the tertiary compound are particularly suitable for preparation of alkali metal/polysulfide batteries wherein the substrate may be exposed to corrosive attack by molten polysulfide salts.

7 Claims, 3 Drawing Figures

SILICON CARBIDE
TERTIARY COMPOUND
TRANSITRON METAL
SUBSTRATE

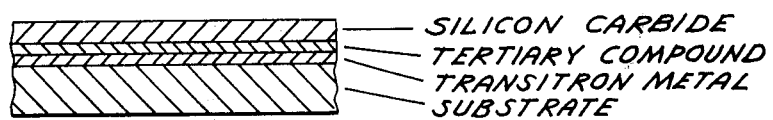
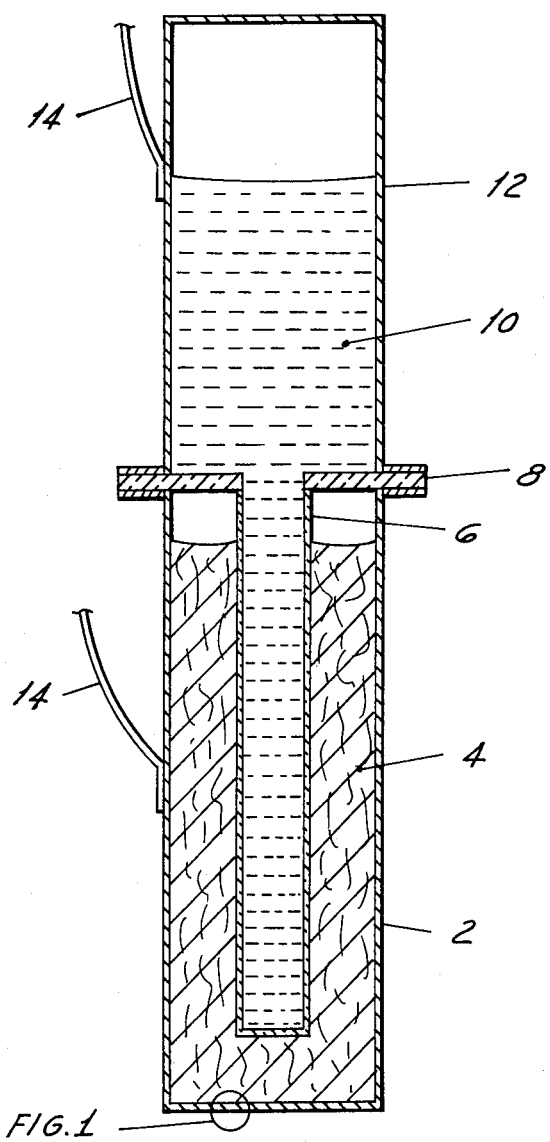

CONDUCTIVE CORROSION RESISTANT MATERIAL AND ALKALI METAL/POLYSULFIDE BATTERY EMPLOYING SAME

BACKGROUND OF THE INVENTION

This invention relates to a method for providing a substrate with a layer of a tertiary compound comprising silicon, silicon carbide and a transition series metal. The thus coated substrate may or may not have an additional top layer of silicon carbide adhered to said tertiary compound layer.

Substrates coated in accordance with the invention demonstrate excellent resistance to corrosive attack, and also demonstrate reasonable electronic conductivity. Thus, the coated substrates are well suited for use in the preparation of alkali metal/polysulfide batteries wherein the substrate is exposed to corrosive attack by molten polysulfide salts.

The method of the invention allows the coating of a substrate not only with tertiary compounds, but alternatively with or without silicon carbide surface layers in an economical and simple manner. The tertiary compounds which are applied as a layer to the substrate in accordance with this invention have previously usually been formed by dissolving silicon carbide in the melt of a transition metal. This method of preparing transition series metal tertiary compounds, however, requires temperatures in the order of 1500° C. or higher. These temperatures are above the melting temperatures of many substrates, including steels, and thus make prior art methods of manufacturing these tertiary compounds unacceptable for application to substrates.

Prior art preparation of silicon carbide/transition series metal materials is described in Pellegrini & Feldman, "LPE Growth of SiC Using Transition Metal-Silicon Solvents", *Proceedings of Third International Conference on Silicon Carbide*, University of South Carolina Press, 1973; Wolff, Das, Lamport, Mlavski & Trickett, "Principles of Solution and Travelling Solvent Growth of Silicon Carbide", *Material Research Bulletin*, Vol. 4, pages S-67 to S-72, Pergamon Press, Inc., 1969; Marshall, "Growth of Silicon Carbide from Solution", *Material Research Bulletin*, Vol. 4, pages S-73 to S-84, Pergamon Press, Inc., 1969; and Griffiths, "Defect Structure and Polytypism In Silicon Carbide", *Journal of Phys. Chem. Solids*, Vol. 27, pages 257–266, Pergamon Press, Inc., 1966.

In the method of this invention, in contrast to prior art methods of forming silicon carbide tertiary compounds, such tertiary compounds are formed as a coating or a layer on a substrate by a diffusion process wherein silicon carbide is diffused into a transition series metal layer at temperatures ranging from about 1000° to about 1300° C.

U.S. Pat. No. 3,772,058 to Bloom describes a method for coating metal substrates with a transition metal followed by application of metal carbides, nitrides, silicides or carbonitrides upon the coated substrate (Col 4, lines 28–31). In a preferred embodiment of the Bloom process metal carbonitride, such as silicon carbonitride, is vapor deposited on the transition metal coated substrate at a temperature ranging from at least 400° C. to about 1200° C. (Col. 4, line 31–Col. 5, line 25).

U.S. Pat. No. 2,784,112 to Nicholson describes the coating of a metallic substrate with a layer of silicon carbide. The coating is applied by heating silicon, silicon carbide and an inert filler in a carbon monoxide or other carbonaceous atmosphere within a temperature range of 1200° to 1400° C. Thus, this patent also does not teach the preparation of a tertiary compound on a substrate by diffusing silicon carbide into a transition series metal layer.

SUMMARY OF THE INVENTION

The invention described herein is a method of coating various substrates including metals, such as stainless steel; ceramics such as alumina; certain glasses such as Vicor manufactured by Corning Glass Works; and quartz, as well as other materials which will be apparent to those skilled in the art, with a layer of a tertiary compound comprising silicon, silicon carbide and a transition series metal. Alternatively, the method also comprises the preparation of a plural coated substrate wherein a layer of silicon carbide is disposed over top of the tertiary compound.

In accordance with the invention, a substrate is provided having at least a surface layer thereon of a transition series metal. This substrate having said surface layer is then coated with a surface layer of silicon carbide particles having an average particle diameter in the range of up to about 2 microns. After application of the silicon carbide particles to the substrate having the surface layer of the transition series metal thereon, the coated substrate is heated in an inert atmosphere, such as argon, to a temperature of between about 1000° C. and about 1300° C. for a time sufficient to allow diffusion to occur between the silicon carbide and the transition series metal layer, thereby forming the tertiary compound.

The thickness of the silicon carbide applied to the substrate bearing the transition series metal layer can be varied. If it is desired to have essentially only a coating of tertiary compound on the substrate, then only a sufficient amount of silicon carbide to diffuse into the transition series metal layer is applied. Alternatively, if it is desired to have a surface coating of silicon carbide remaining over top of the tertiary compound, then a greater amount of silicon carbide will be applied prior to diffusion.

Substrates coated with the tertiary compound or tertiary compound/silicon carbide layers in accordance with the method of this invention are particularly suitable, as mentioned above, for preparation of alkali metal/polysulfide batteries wherein the substrate may be exposed to corrosive attack by molten polysulfide salts. Thus, it is particularly useful to employ coated substrates made in accordance with the invention as a container forming a portion of the cathodic reaction zone of an alkali/polysulfide battery, such as a sodium sulfur battery, or alternatively as the current collector in such a battery. The coated substrates made in accordance with the invention are particularly useful not only because of their resistance to corrosive attack by molten polysulfide salts, but also because of their reasonable conductivity. Both silicon carbide and tertiary compounds formed from silicon carbide and transition series metals show reasonable electronic conductivity and therefore are suitable for use in such a battery environment.

BRIEF DESCRIPTION OF THE DRAWING

FIG. 1 shows a cross-sectional view of a typical coated substrate manufactured in accordance with the method of the invention.

FIG. 2 shows an alkali metal/polysulfide battery employing the coated substrate manufactured in accordance with the invention as a container which is exposed to molten polysulfide salts in the cathodic reaction zone.

Figure 3:
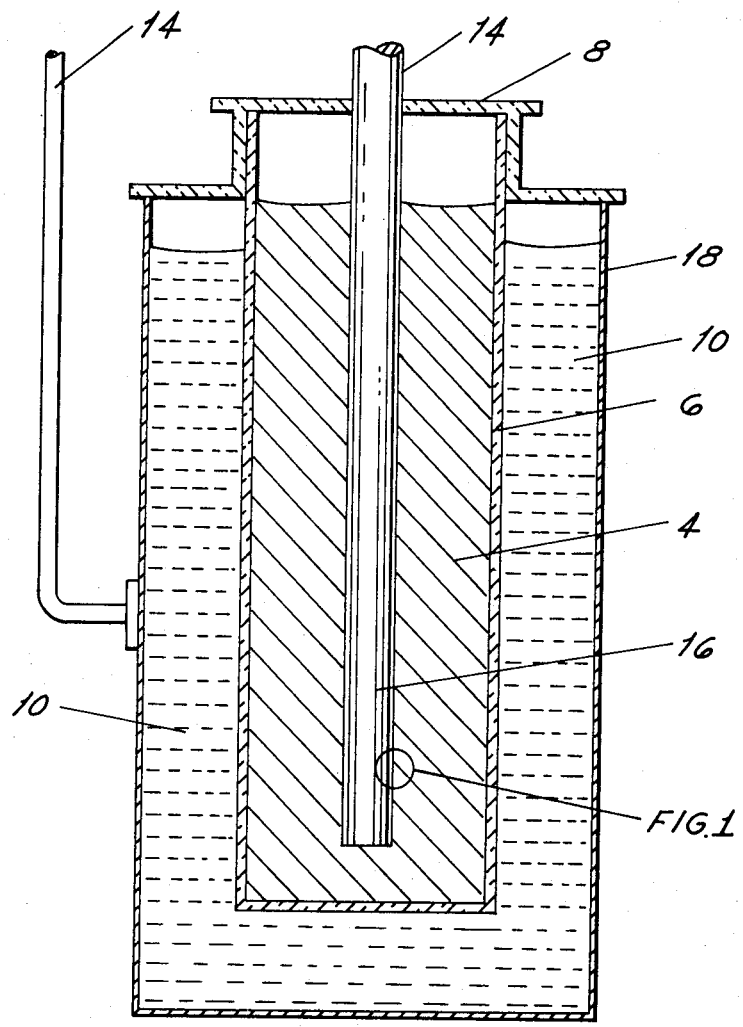
FIG. 3 shows another embodiment of an alkali metal/polysulfide battery wherein a substrate coated in accordance with the method of the invention is employed as a current collector.

The invention will be more fully understood from a reading of the following detailed description of the invention when read with reference to the drawing.

DETAILED DESCRIPTION OF THE INVENTION

As mentioned above, in accordance with the method of the invention, a substrate is provided having at least a surface layer thereon of a transition series metal. The substrate may be any substrate which is capable of having a layer of transition series metal applied and adhered thereto, and which is capable of withstanding the temperatures to which the substrate is exposed during processing in accordance with the method of the invention.

Preferred substrates, in accordance with the invention, are metal. In particular, stainless steel is preferred. Exemplary of other substrates which may be employed are: ceramics, such as alumina; certain glasses such as Vicor; and quartz. However, those skilled in the art will recognize that numerous other substrate materials could be employed in the process of the invention. Selection of a substrate, of course, will also ultimately depend on the end use of the coated material.

The transition series metal may be applied to the substrate by numerous techniques which will be apparent to those skilled in the art. For example, the transition series metal may be deposited by evaporation in a vacuum, by electroplating, or by still other techniques which will depend on the shape of the object and the transition metal used. Alternatively, the substrate itself may be completely formed of the transition series metal. However, it is generally preferred not to employ such a substrate because of the additional expense added by use of such a metal as the entire substrate.

While all transition series metals appearing within the transition elements of groups $3b$, $4b$, $5b$, $6b$, $7b$, 8, $1b$ and $2b$ of the Periodic Table of Elements as set forth in the Handbook of Chemistry and Physics, Chemical Rubber Company, 45th Edition, (1964), may be employed, preferred transition series metals for use in the method of the invention are those in groups $3b$, $4b$ and $5b$ of the Periodic Table of Elements. Particularly preferred transition series metals are selected from the group consisting of chromium, titanium, niobium, tantalum, molybdenum and zirconium. The most preferred transition series metal for use in accordance with the method of the invention is chromium.

The substrate having the layer of transition series metal thereon is provided with a coating over said surface layer of silicon carbide particles having an average particle diameter in the range of up to about 2 microns. In preferred embodiments of the method of the invention, the silicon carbide particles have an average particle diameter of between about 0.1 and about 0.5 microns, and in particularly preferred embodiments the particles are about 0.2 microns in average particle diameter.

The thickness of silicon carbide applied to the substrate bearing the transition series metal layer will vary depending upon the end result desired. It may be desirable to provide a substrate merely having a surface layer of the tertiary compound thereon. In such a case, only that amount necessary to diffuse into the transition series metal and form the tertiary compound is employed. In those cases where it is desired to have a surface layer of silicon carbide remaining after the diffusion step, a greater amount of silicon carbide will be applied. Of course, those skilled in the art will recognize that the amount of silicon carbide applied will vary not only depending upon the aforementioned considerations, but also upon the length of time over which the diffusion takes place, the temperature of diffusion, etc.

The layer of transition series metal on the substrate is generally of a thickness sufficiently great so that silicon carbide applied thereto does not react directly with the metal substrate in those cases where the substrate itself is metal. Of course, in those cases where the substrate is not metal, this is not a concern.

In accordance with a preferred embodiment of the invention, after the silicon carbide particles are applied to the substrate bearing the layer of transition series metal, the particles are pressed into contact with the transition metal layer. In a particularly preferred embodiment, this pressing is accomplished by hot pressing techniques.

After the silicon carbide layer has been applied to the substrate, the thus coated substrate is heated in an inert atmosphere, such as argon, to a temperature between about 1000° C. and 1300° C. for a sufficient time to allow diffusion to occur between the silicon carbide and the transition series metal layer, thereby forming a tertiary compound. It will be recognized, of course, that the exact temperature at which the diffusion takes place will vary depending upon the amount of tertiary compound to be formed, the particular transition series metal employed, the thickness of silicon carbide and transition series metal layer, etc.

FIG. 1 shows a cross-section of a coated substrate made in accordance with the method of the invention. The substrate, as mentioned above, may or may not be a metal. The transition metal layer is disposed along a surface of the substrate. As shown in the drawing, some transition metal may be left after the diffusion step has taken place. Alternatively, all of the transition series metal may have become a part of the tertiary compound formed during the diffusion step. The layer disposed above the transition series metal is the tertiary compound formed in the diffusion step of the method. The silicon carbide layer appearing over top of the tertiary compound is, as mentioned above, optional and its presence will be dependent upon the amount of silicon carbide applied and the length of the diffusion step in accordance with the method.

As mentioned above, one of the suitable applications of substrates prepared in accordance with the method of the invention is an alkali metal/polysulfide battery, such as a sodium sulfur battery, wherein cathodic reactant such as sodium polysulfide, is in contact with various battery parts. Coated substrates made in accordance with the method of the invention are very well suited to formation of parts exposed to this corrosive cathodic reactant.

In one embodiment of the sodium sulfur battery, to be described hereinafter in conjunction with the drawings, the coated substrate prepared in accordance with the invention is employed as a container forming a portion of the wall of the cathodic reaction zone. In accordance with another embodiment of the sodium sulfur battery, to be described hereinafter in conjunction with the drawing, the material prepared in accordance with the method of the invention is employed as the current collector of the device.

The invention will be even more fully understood from the following detailed examples which are presented by way of illustration and not to be considered as limiting.

EXAMPLE I

A piece of 446 stainless steel is cleaned by etching it lightly in a solution of hydrochloric acid, rinsing it in distilled water and then drying with alcohol. The stainless steel sample is then put into an ultra-high vacuum evaporation chamber and a chrome film about one micron thick is evaporated by sublimation onto the sample. The chrome coated sample is then coated with a slurry of fine silicon carbide powder. The slurry consists of silicon carbide powder of an average size particle diameter of 0.2 microns and alcohol. Next, the samples are put into an induction furnace in a recrystallized alumina crucible. The furnace is then evacuated, filled with an inert gas, such as argon, and the sample heated to about 1125° C. for three hours. After the sample is cooled, loose silicon carbide powder is washed off in an ultrasonic cleaner with alcohol, leaving a strong, well adhered tertiary compound coating on the substrate.

EXAMPLE II

An Inconel sample was commercially electroplated with two mills of chromium. The sample was then immersed in a fine silicon carbide powder in a sample holder inside a hot pressing furnace. The sample holder consisted of a graphite cylindrical sleeve with two solid graphite cylinders capable of sliding within the sleeve. The space between the two cylinders was filled with silicon carbide powder (average particle diameter 0.2 microns) to a depth of about ½ inch with the 0.30 mil Inconel sample within the silicon carbide powder. Care was taken that the Inconel sample did not come into contact with the graphite sample holder. A pressure of about 4000 psi was applied to the top graphite cylinder, pressing the silicon carbide powder against the Inconel sample. This gives a much larger surface area for diffusion to occur between the silicon carbide powder and the chromium surface layer on the Inconel. The atmosphere within the hot pressing furnace was a vacuum or a reducing atmosphere of 10% hydrogen, 90% nitrogen (other reducing atmospheres may also be used). The reducing atmosphere is helpful in removing any oxide layer on the chromium, thus giving a clean chromium surface for diffusion to occur between the chromium and the silicon carbide powder. The sample is heated to 1100° C. for about three hours and then cooled to room temperature and removed from the loose unsintered silicon carbide powder surrounding it. The loose powder may be used for other samples. A strong, well adhered conducting layer remains on the sample surface.

EXAMPLE III

Coated substrates prepared in accordance with the procedures described in Examples I and II and used in the preparation of sodium/sulfur cells. Two such cells are shown in FIGS. 2 and 3 and the drawing. (a) The cell of FIG. 2 employs the coated substrate as the container 2 with the portion of the coated substrate bearing the tertiary compound or silicon carbide/tertiary compound being exposed to the interior of the cell, thus providing resistance against sodium polysulfide which is generated in the cathodic reaction zone 4 of the cell.

Other major components of the conventional sodium sulfur cell of FIG. 1 are the metal sodium container 12 containing sodium 10, insulating seal 8, cation-permeable, solid electrolyte ceramic 6 and leads 14.

As is well known, one of the major material problems associated with the sodium sulfur battery is to find an electronically conducting sulfur container that is non-corrosive in sodium polysulfide environments at battery operating temperatures. Substrates coated with tertiary compounds prepared in accordance with this invention fill this need.

By coating the inside of a chrome plated or otherwise chrome covered metal sulfur container with a silicon carbide tertiary compound layer, a container is obtained that is corrosion resistant against sodium polysulfide attack and that is also electrically conducting.

The chrome plated metal substrate is especially appropriate for the sulfur container of the sodium/sulfur cell. If the silicon carbide tertiary compound layer has any defects in it, or the underlying chrome is exposed, the container can still be protected from sodium polysulfide corrosion by oxidizing the exposed chrome. Chrome itself is attacked by sodium polysulfides, but chrome oxide is not attacked. The container still remains electronically conducting since the area of defects is negligible to the total area of container covered by the silicon carbide tertiary compound.

(b) FIG. 3 shows another sodium/sulfur cell configuration employing a coated substrate prepared in accordance with the invention. In this cell configuration the cathodic reactant (i.e., the sulfur/sodium polysulfide melt) 4 is inside ceramic electrolyte 6 and sodium 10 is on the outside. The cell container or can 18 then forms the anodic reaction zone. This cell geometry requires a highly conducting metal current collector 16 which is connected to the external circuit by a lead 14 and is insulated electrically by seal 8 from the anodic reactant container 18. Note that a lead 14 also connects the external circuit with can 18.

A suitable metal current collector 16 is a coated substrate such as is prepared in Examples I and II(a).

Although this invention is described in relation to its preferred embodiments, it is to be understood that various modifications thereof will be apparent to those skilled in the art upon reading the specification in conjunction with the drawing, and it is intended to cover such modifications as fall within the scope of the appended claims.

We claim:

1. A method of preparing an article which is electronically conductive, but resistant to corrosive attack by molten polysulfide salts, which method comprises (1) providing a metal substrate having at least a surface layer thereon of a transition series metal selected from the group consisting of chromium, titanium, niobium, tantalum, molybdenum and zirconium, (2) coating said surface layer with silicon carbide particles have an average particle diameter ranging between about 0.1 and about 0.5 microns, (3) pressing said silicon carbide particles into contact with said transition series metal layer so as to provide greater contact therebetween, and (4) heating said substrate having said surface layer and layer of silicon carbide thereon in an inert atmosphere to a temperature of between about 1000° C. and about 1300° C. for a sufficient time to allow diffusion to occur between said silicon carbide and said transition series metal layer, thereby forming a layer of a tertiary compound comprising silicon, silicon carbide and said transition series metal.

2. A method in accordance with claim 1, further comprising providing said substrate having a layer of tertiary compound thereon with a surface layer of silicon carbide, wherein said coating of silicon carbide is applied in a sufficient thickness such that a surface coating of silicon carbide covering said tertiary compound layer remains after the substrate is heated to cause said diffusion.

3. A method in accordance with claims 1 or 2, wherein said substrate is steel.

4. A method in accordance with claims 1 or 2, wherein said transition series metal is of a thickness sufficiently great that the silicon carbide applied thereto does not react directly with said metal substrate during diffusion.

5. A method in accordance with claims 1 or 2, wherein said substrate is a transition series metal and said diffusion occurs between said silicon carbide coating and the said transition series metal of said substrate near the surface thereof.

6. A method in accordance with either of claims 1 or 2, wherein said transition series metal is chromium and said coated substrate is heated to a temperature between about 1000° C. and about 1250° C.

7. A method in accordance with claim 1 wherein said pressing is accomplished by hot pressing.

* * * * *